No. 624,900. Patented May 16, 1899.
T. W. BARBER.
METHOD OF MANUFACTURING ARTIFICIAL STONE.
(Application filed July 16, 1898.)
(No Model.)
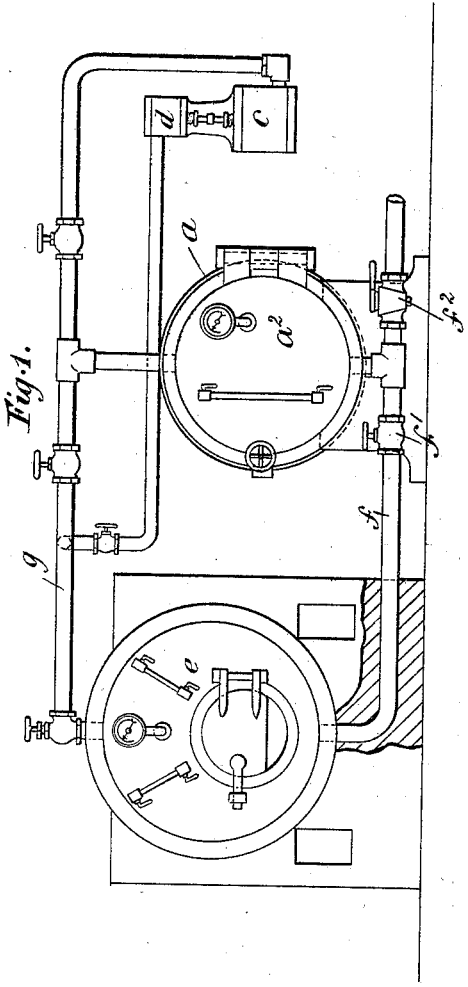
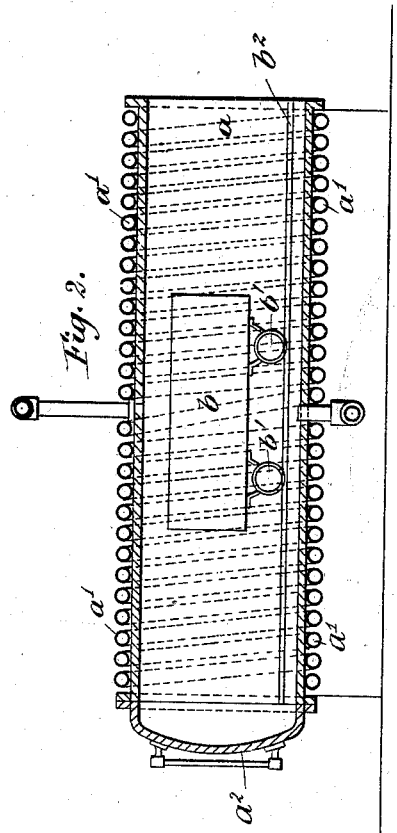

UNITED STATES PATENT OFFICE.

THOMAS W. BARBER, OF LONDON, ENGLAND, ASSIGNOR TO LEWIS PETER FORD, OF SAME PLACE.

METHOD OF MANUFACTURING ARTIFICIAL STONE.

SPECIFICATION forming part of Letters Patent No. 624,900, dated May 16, 1899.

Application filed July 16, 1898. Serial No. 686,147. (No specimens.)

*To all whom it may concern:*

Be it known that I, THOMAS WALTER BARBER, a subject of the Queen of Great Britain, residing at London, England, have invented certain new and useful Improvements in Methods of Manufacturing Artificial Stone and Concrete, of which the following is a full, clear, and exact description, and for which I have made application for British patent, No. 8,226, dated April 6, 1898, in company with the above-named Lewis Peter Ford, and the latter has made application for German patent, dated April 14, 1898.

The invention relates to improvements in the method of manufacturing artificial stone and concrete, and has for its objects the removal of the air from the material before it is slaked in the molds, the facilitating of the slaking process, and the acceleration of the drying and indurating of the stone when made.

The principal materials I employ are lime and sand, which are ordinarily used in the manufacture of artificial stone.

Apparatus suitable for carrying my invention into effect is illustrated in the accompanying drawings, in which—

Figure 1 is an elevation, partly broken out, of a complete apparatus employed in the manufacture of artificial stone according to my invention; and Fig. 2 is a section of the closed vessel or chamber with a mold-box therein in which the materials are treated.

In carrying the invention into effect a closed vessel or chamber $a$ is utilized capable of withstanding considerable pressure and of suitable form for the reception of the molds $b$ into which the dry material is placed. The molds $b$ are preferably provided with wheels $b'$ to run on rails $b^2$, arranged in the chamber $a$. The molds $b$ when filled and the materials sufficiently rammed therein are placed within the said vessel or chamber $a$, which is then hermetically closed by means of ends or covers $a^2$, only one of these covers being shown in Fig. 2. The air is exhausted from the vessel or chamber $a$, and consequently from the material in the molds $b$, which latter are not hermetically closed, by means of an air-pump $c$, attached to the vessel $a$, or by any other suitable means. The air-pump $c$ is operated by the engine $d$. This evacuation facilitates the entry of the slaking-water into the materials and creates a condition favorable for the production of silicate of lime. Hot water at a temperature of about 292° to 307° Fahrenheit—that is, under a pressure of three to four atmospheres—is then admitted into the vessel or chamber $a$ from the boiler $e$ by means of the tube $f$ and cock $f'$ for a short period—say from about one to two hours—which perfectly hydrates the lime, after which steam under high pressure from the boiler $e$ is admitted to the vessel $a$ by the tube $g$, and the water is allowed to escape by closing the cock $f'$ and opening the cock $f^2$. The action of the steam accelerates the formation of silicate of lime and maintains a suitable temperature of about 307° to 320° Fahrenheit without either denuding the mass of any of the water of hydration or giving it surplus moisture, maintaining, in fact, an ideal state of equilibrium. The drying of the stone is effected by exhausting the vessel or chamber $a$ by means of the pump $c$ or in any convenient manner until the molds $b$ are ready for removal.

The chamber $a$ is maintained during the drying operation at a suitable temperature of about 212° to 350° Fahrenheit by means of a steam-coil $a'$ or jacket or in any other convenient manner.

In some cases the drying operation may be effected in a separate chamber of similar construction to the chamber $a$, and the stone or concrete may be removed from the molds $b$ to accelerate the drying process.

It has been found by experiments that by first slaking the materials with hot water and then completing the process by steam after allowing the water to escape superior results are obtained and a considerable economy in time is effected as compared with the system of slaking entirely by hot water or steam or by hot water followed by injection of steam into the water.

For small blocks of artificial stone it is preferable to subject the dry mixed materials in the molds to a vacuum for about an hour, then to the action of hot water under a pressure of three or four atmospheres for about the same period, and then, after expelling the water, to the action of steam at a pressure of from about four to five atmospheres for about five hours, after which the steam is shut off and a vacuum again created, the closed vessel or chamber being maintained at a suitable temperature—say at about 212° Fahrenheit for small blocks to 350° Fahrenheit for large blocks—by any convenient means throughout the process and until the artificial stone is dry. For very large blocks rather longer periods are necessary.

In order to increase the hardness of the artificial stone or concrete and to accelerate the process of induration, a certain proportion—say from one to five per cent.—of dry a powdered alkaline silicate or other chemical compound possessing similar properties is sometimes combined with the lime and sand. It is known that artificial stone after manufacture has been treated superficially with such chemical compounds in order to cause induration; but it has been found that blocks so treated only become indurated upon the surface even after a considerable lapse of time. The improved process has the advantage of simplicity of manipulation and greater accuracy and uniformity of results, and the induration takes place concurrently with the manufacture of the stone. By this improved process a homogeneous artificial stone of equal hardness throughout and having no air-cracks or similar defects can be produced in much less time than by the present methods, and the stone when removed from the molds is dry, hard, and ready for use.

To color the stone, dry powdered pigments are used, mixed in with the other ingredients.

To make a party or multi colored stone, blocks of stone are first made by the process hereinbefore described of the various colors required. These blocks are immediately or before complete induration broken up into small pieces of the required dimensions and then mixed in the right proportions, together with a fresh quantity of lime and sand, (or lime only if the proportion of the broken pieces to the total mass required does not admit of sand also being added,) and are placed in the molds $b$ and made into solid blocks in the same manner as hereinbefore described—that is to say, they are placed in a vessel $a$ and submitted to a vacuum, then to hot water under pressure, the water is allowed to escape, and the materials are submitted to the action of steam, finally being dried *in vacuo*. I would here remark that naturally-colored stone may be substituted for colored artificial stone.

It is highly essential for the production of a good stone that the hydration be perfectly carried out. The induration of the lime, the most important feature in the formation of the mass, is delayed seriously when the materials are more than hydrated, and the enfeebling of the lime means a weaker product.

Having thus particularly described and ascertained the nature of the said invention and in what manner the same is to be performed, I would have it understood that I do not claim the use of sand and lime for making artificial stone, nor the use of alkaline silicate for accelerating induration, nor the use of molds and air-tight chambers, nor the use of an air-pump, nor the use of water only, nor steam only, nor water with steam injected therein, for slaking, each separately considered; but

What I claim is—

1. The process of manufacturing artificial stone, which consists in first submitting the materials to a vacuum to exhaust the air therefrom, then submitting them to the action of hot water under pressure, then submitting them to the action of steam under high pressure and removing the water, then again submitting the materials to a vacuum while maintaining them at a suitable temperature till dryness is reached, substantially as described.

2. The process of manufacturing artificial stone, which consists in first submitting the materials in molds to a vacuum to exhaust the air therefrom, then submitting them to the action of hot water under pressure, then submitting them to the action of steam under high pressure and thereby removing the water, then again submitting the materials to a vacuum while maintaining them at a suitable temperature till dryness is reached, substantially as described.

3. The process of manufacturing artificial stone, which consists in first submitting the materials in molds to a vacuum to exhaust the air therefrom, then submitting them to the action of hot water under pressure, then submitting them to the action of steam under high pressure, and thereby removing the water, then submitting the materials to a suitable temperature till dryness is reached, substantially as described.

In testimony whereof I affix my signature in presence of two witnesses.

T. W. BARBER.

Witnesses:
J. BEARN,
CLAUDE K. MILLS.